United States Patent
Nilsson

[15] 3,643,521
[45] Feb. 22, 1972

[54] SEALING MEANS FOR A TRANSMISSION MECHANISM

[72] Inventor: Sven Walter Nilsson, Partille, Sweden

[73] Assignee: Aktiebolaget Svenska Kullagerfabriken, Goteborg, Sweden

[22] Filed: Jan. 15, 1970

[21] Appl. No.: 3,106

[30] Foreign Application Priority Data

Jan. 16, 1969 Sweden..................................521/69

[52] U.S. Cl.................................................74/459, 277/29
[51] Int. Cl.......................................F16h 55/00, F16k 41/00
[58] Field of Search.............................277/29, 165; 74/459

[56] References Cited

UNITED STATES PATENTS

| | | | |
|---|---|---|---|
| 2,757,548 | 8/1956 | Smith et al. | 74/459 X |
| 2,977,138 | 3/1961 | Brittain, Jr. | 277/29 |
| 3,116,931 | 1/1964 | Edwards | 277/165 |
| 3,532,004 | 10/1970 | Nilsson | 74/459 |

*Primary Examiner*—Arthur T. McKeon
*Attorney*—Howson and Howson

[57] ABSTRACT

The nut component of a transmission mechanism is at each end provided with a sealing member designed as a tubular element enclosing the screw of the transmission and having an internal, helical ridge to cooperate therewith. The member is further provided with means for biasing the member away from the nut in such a manner that said ridge will be forced against the sidewall of the groove in the screw remote from the nut, whereby the groove is continuously swept clean as the nut is displaced along the screw. The sealing member is further designed as a reservoir for grease and is equipped to release surplus grease from the nut, when the latter is being filled.

8 Claims, 2 Drawing Figures

FIG. 1
FIG. 2
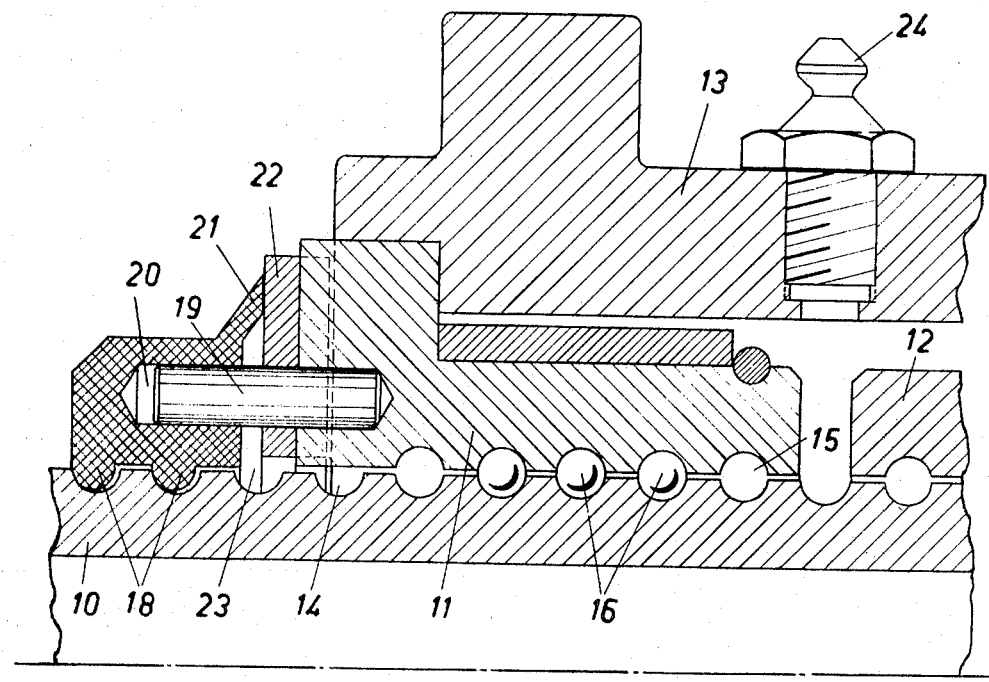
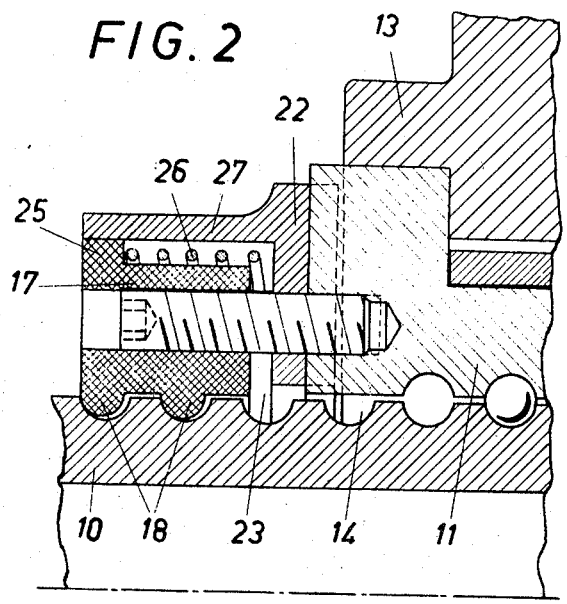
INVENTOR.
SVEN WALTER NILSSON
BY Howson & Howson
ATTYS.

3,643,521

SEALING MEANS FOR A TRANSMISSION MECHANISM

BACKGROUND OF THE INVENTION

With transmission mechanisms comprising a threaded bar and a nut working thereon it is highly important that the groove in a threaded bar be kept clean, and that the nut is supplied with a satisfactory quantity of grease. This is especially important with so-called ball nut mechanisms.

SUMMARY OF THE INVENTION

The present invention refers to a sealing means for mechanisms of above-mentioned types, which will in an efficient manner keep the groove in the bar clean as the nut is displaced thereon, and which also has a good capacity to retain grease within the nut. The invention is characterized by elements designed to bias the member axially away from the nut.

BRIEF DESCRIPTION OF THE DRAWINGS

FIG. 1 shows one embodiment of the invention, and
FIG. 2 shows a modification thereof.

DESCRIPTION OF THE PREFERRED EMBODIMENTS

The mechanism shown in FIG. 1 comprises an elongated threaded bar 10 or screw, on which a nut device, consisting of two main components 11 and 12 respectively, are mounted. The components of the nut are maintained as a unit, by means of an external sleeve 13, the sleeve being designed to adjust the relative position of the two components 11 and 12. The helical groove 14 on the bar, and a corresponding groove 15 in the components of the nut are designed in such a manner that they together will form a helical path with a circular cross section. A number of balls 16 are fitted into each component of the nut to cooperate with this path. Each component of the nut is further provided with parts not shown on the drawing, which convey the balls from one end of the component to the other in such a manner that the balls will circulate as the nut is displaced along the bar. Mechanisms of this type are well known in the art, and many different embodiments are available. The nut mechanism by itself thus forms no part of the present invention.

A sealing means is mounted at each end of the nut and comprises an annular member 17 made of p.t.f.e. or similar synthetic resin having good frictional properties and a certain resiliency. The internal surface of each sealing member is provided with a helical ridge 18 adapted to fit into the groove 14 in the bar, to almost completely fill the cross section of said groove. Each member is connected to one of the components 11 or 12 of the nut, respectively, by means of a number of pegs 19 extending axially away from the components and designed to fit into corresponding bores 20 in the main body of the sealing member. The number of these bores, in each member is greater than the number of pegs, and the bores are spaced in such a manner in the member, that the latter may be fixed in different angular positions in relation to the nut, whereby a suitable axial pressure of the ridge of the member with respect to the groove in the bar will be obtained.

At the end of the member turned towards the nut an outwardly directed conical flange 21 is formed, the outer edge of which is cut perpendicular to the longitudinal axis of the bar in such a manner that the flange will be provided with a surface which will engage the end surface of the nut component, or a washer 22 fitted thereto. By the angular positioning above mentioned between the member and the sealing members it is possible to obtain a certain pressure between the flange and the nut, and this pressure will be maintained constant during the displacement of the nut as the movement of the nut as well as of the sealing member is determined by the groove 14 in the bar. This means in the first that the ridge 18 is forced against the wall of the groove 14 remote from the nut in such a manner that the groove will be swept clean and furthermore that foreign matter is prevented from entering the nut.

Between the sealing member and the end surface of the nut an annular chamber 23 is formed, which serves as reservoir for grease. When the nut is displaced, for instance to the left on the drawing, grease from the left chamber 23 will be spread over the bar ahead of the balls 16, while simultaneously the sealing member at the opposite end of the nut will scrape away grease from the bar and force it into the right-hand chamber 23. When the nut is displaced to the right grease will be spread over the bar from last-mentioned chamber ahead of the balls, while the left member will collect grease from the groove. The nut is provided with a nipple 24 through which grease may be forced into the nut to completely fill the spaces inside the latter. The sealing member 17 will thereby serve as safety valves and will release any surplus of grease. The grease forced out past the members is in the first hand the used grease to be found in the chambers 23. The angular positioning above mentioned will determine the pressure between the member and the nut, and thereby also to a certain extent the volume of grease contained in the nut.

With the embodiment shown in FIG. 2 corresponding parts are denoted by the same reference numerals.

The sealing member 17 is at end remote from the nut provided with an outwardly directed flange 25, between which and the nut a compression spring 26 is fitted. This ensures that the desired biasing away from the nut is maintained. In order to illustrate the desired function the ridge of the member is shown as not completely filling the groove 14. The ridge 18 is nevertheless tightly pressed against the sidewall of the groove remote from the nut. Furthermore, the grease is easily forced out below the member in order to lubricate the movement of the ridge through the groove.

A tubular sleeve 27 extends from the washer 22 and encloses member 17 as well as spring 26, and fits with its free ends against flange 25 with a right fit. It forms thereby the counterpart to the safety valve formed by flange 21 in the previous embodiment.

The sealing members may be formed by suitable materials which have a small frictional resistance and provide the desired sealing. The shape of the components may furthermore vary according to the shape of the design of the components of the transmissions mechanism. Instead of the pegs 19 and the bores the elements may be retained in the desired angular position with respect to the nut by means of a number of radially directed ridges at one of the parts which cooperate with radially directed grooves in the juxtaposed part.

What is claimed is:

1. In a transmission mechanism comprising a bar and a nut member adapted for relative axial movement, said bar having a helical groove in its outer periphery, a sealing member made of resilient material disposed at least at one axial end of said nut member and formed to cooperate with said helical groove, and means mounting said sealing member in a manner to bias the same axially relative to said nut member.

2. In a transmission mechanism comprising a bar and a nut member adapted for relative axial movement, said bar having a helical groove in its outer periphery, a sealing member made of resilient material disposed at least at one axial end of said nut member and formed to cooperate with said helical groove, said sealing element including a body portion and an outwardly directed, resilient flange at one end of said body portion confronting and adapted to abut the axial end face of said nut member.

3. In a transmission mechanism comprising a bar and a nut member adapted for relative axial movement, said bar having a helical groove in its outer periphery, a sealing member made of resilient material disposed at least at one axial end of said nut member and formed to cooperate with said helical groove and a compression spring mounted between said sealing member and nut member adapted to bias the sealing member axially relative to said nut member.

4. In a transmission mechanism comprising a bar and a nut member adapted for relative axial movement, said bar having a helical groove in its outer periphery, a sealing member made of resilient material disposed at least at one axial end of said nut member and formed to cooperate with said helical groove and means mounting said sealing member in a manner to bias the same axially relative to said nut member, said sealing member being provided with a plurality of axially directed bores and said nut member being provided with a plurality of axially directed pegs designed to fit into said bores, the number of bores being greater than the number of pegs and the pitch between the pegs and the bores being such that the sealing member may be locked in different angular position in order to obtain the desired pressure between the sealing member and said bar.

5. The transmission mechanism according to claim 2 including means defining a space between the flange, the main body of the sealing member and the nut designed to form a chamber for grease, the contact surface between the flange an the nut serving as outlet for surplus grease.

6. The transmission mechanism according to claim 1 in which the sealing element consists of a compression spring fitted between the nut and the member.

7. The transmission mechanism according to claim 3 in which the sealing member at its end remote from the nut is provided with an outwardly directed flange and a tubular sleeve is fitted to the nut to enclose the spring and the sealing member and to contact the flange thereof with a tight fit.

8. The transmission mechanism according to claim 7 in which a chamber to contain grease is formed between the tubular sleeve and the main body of the member, the contact surface between the flange and the tubular sleeve serving as outlet for surplus grease.

* * * * *